United States Patent
Lam et al.

[11] Patent Number: 5,921,276
[45] Date of Patent: *Jul. 13, 1999

[54] PISTON-TYPE CHECK VALVE WITH DIFFUSER

[75] Inventors: Tony M. Lam; Keith D. Farquharson, both of Edmonton, Canada

[73] Assignee: Stream-Flo Industries, Ltd., Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/544,128

[22] Filed: Oct. 17, 1995

[51] Int. Cl.⁶ .................................................. F16K 15/06
[52] U.S. Cl. ................. 137/514.7; 137/220; 137/533.31; 137/543
[58] Field of Search ............................... 137/220, 514.7, 137/533.31, 543

[56] References Cited

U.S. PATENT DOCUMENTS

| | | | |
|---|---|---|---|
| 666,245 | 1/1901 | Ginaca | 137/543 |
| 1,800,545 | 4/1931 | Lamer | 137/220 |
| 2,870,779 | 1/1959 | Thomiszer | 137/542 |
| 3,141,471 | 7/1964 | Williamson . | |
| 3,993,093 | 11/1976 | Mokveld | 137/484.6 |
| 4,638,832 | 1/1987 | Mokveld | 137/514.5 X |
| 4,693,270 | 9/1987 | Yaindl | 137/514.3 |
| 4,747,426 | 5/1988 | Weevers | 137/514.7 X |
| 4,766,929 | 8/1988 | Yaindl | 137/514.3 |

FOREIGN PATENT DOCUMENTS 1254858  11/1971  United Kingdom .

OTHER PUBLICATIONS

Brochure—Mannesmann Demag Huttentechnik Meer—Type DRV–Z Nozzle Check Valve.
Brochure—Mannesmann Demag Huttentechnik Meer—Type KRV Wafer Check Valve.
Brochure—NozCheck Valve Body Styles.

*Primary Examiner*—Stephen M. Hepperle
*Attorney, Agent, or Firm*—Sheridan Ross P.C.

[57] ABSTRACT

An axial recess is formed in the downstream end of the diffuser body. An annular tail member is mounted on the downstream end of the valve piston. The tail member retracts into the recess when the piston is in the closed position and provides an extension of the diffuser body when the piston is in the open position.

1 Claim, 7 Drawing Sheets ered by
PISTON-TYPE CHECK VALVE WITH DIFFUSER

FIELD OF THE INVENTION

This invention relates to a modified piston-type check valve having an internal diffuser.

BACKGROUND OF THE INVENTION

A piston-type check valve having an internal diffuser is a known product. A typical example is shown in FIG. 1. More particularly, it involves:

an outer valve body forming a longitudinally extending, through passage and an internal annular seat at its upstream end;

the body is typically of the type known as a "full" body and has end flanges for bolting to end flanges in the line in which the valve is to be used;

a diffuser is centrally mounted in the body passage. The diffuser comprises a hollow, tear/drop-shaped body which combines with the inner surface of the valve body to form an annular, streamlined flow passageway. A piston, comprising a disc and a shaft, is positioned centrally of the diffuser body. The disc is located at the upstream end of the diffuser body and seals against the seat in the closed position. The shaft is guided by a central guide member carried by the diffuser body, so that the piston travels along the long axis of the body. When the piston is displaced from the seat by fluid pressure, it opens the flow passageway. A spring is provided to normally urge the piston to the closed position.

Valves of this type are characterized by a low pressure drop.

It would be desirable to shorten the length of the valve, to reduce its cost and provide it with a short face-to-face dimension, so that it can be used in confined space or as a wafer valve.

It is the objective of this invention to provide a valve design characterized by a reduced body length.

SUMMARY OF THE INVENTION

In accordance with the invention, we have modified a piston-type check valve having an internal diffuser by:

forming the downstream end of the diffuser body/guide member unit so as to provide an axial recess;

mounting an annular tail member on the downstream end of the piston shaft, which tail member retracts into the recess when the piston is in the closed position. The tail member cooperates with the diffuser body to form a substantially continuous extension thereof when the piston is in the open position. The valve body downstream end face may be made substantially flush with the downstream end face of the tail member in the closed position, so that the tail member projects downstream, beyond the valve body end face, when in the open position; and preferably dimensioning the tail member so that there is a clearance between its outer circumferential surface and the recess surface, for the escape of fluid out of the recess when the tail member is retracting into the recess on the closing stroke. Preferably, and in addition, a dump passage is formed through the diffuser body/guide member unit, commencing part way along the length of the recess and connecting the recess with the downstream end of the passageway. As a result of this construction, fluid may escape readily from the recess through both the clearance and dump passage in the initial portion of the closing stroke, but is metered by the clearance alone in the final portion of the stroke after the tail member blocks the dump passage, to thereby dampen or retard the piston in this final stage of closing and reduce closing impact.

By making these modifications, the diffuser can be extended and the valve body shortened. This has made it possible to use a diffuser in a wafer-type body (although this is not a limitation—the invention can be incorporated into flange and stud-type bodies as well). In addition, the closing stroke can now advantageously be damped at the end of the closing stroke.

Broadly stated, the invention comprises a piston-type check valve having an internal diffuser, said valve having upstream and downstream ends, comprising: a valve body having an inner surface forming a through passage, said body further having an internal annular seat at its upstream end; a diffuser mounted within the passage downstream of the seat, said diffuser comprising a hollower diffuser body having an outer surface that cooperates with the valve body's inner surface to form an annular streamlined passageway for fluid flow through the value, said diffuser having a downstream end which is substantially even with the downstream end of the body; said diffuser body supporting an internal, centrally located guide member, said diffuser body and guide member combining to provide a unit having an inner surface forming an axial bore having an enlarged diameter section at its downstream end, so that a recess is formed; a sliding piston associated with the diffuser and comprising a disc and shaft, the piston being movable between a closed position, in which the disc seals against the seat and closes the upstream end of the annular passage, and an open position whereby fluid may flow through the annual passage, the shaft extending through the bore of the unit and being guided thereby; a tail member mounted on the downstream end of the shaft and being receivable in the recess in the closed position, said tail member, when the piston is in the open position, providing an extension of the diffuser beyond the downstream end of the body and, when in the closed position, being retracted fully within the body; and means for normally urging the piston to the closed position.

DESCRIPTION OF THE PREFERRED EMBODIMENT

Figure 1:
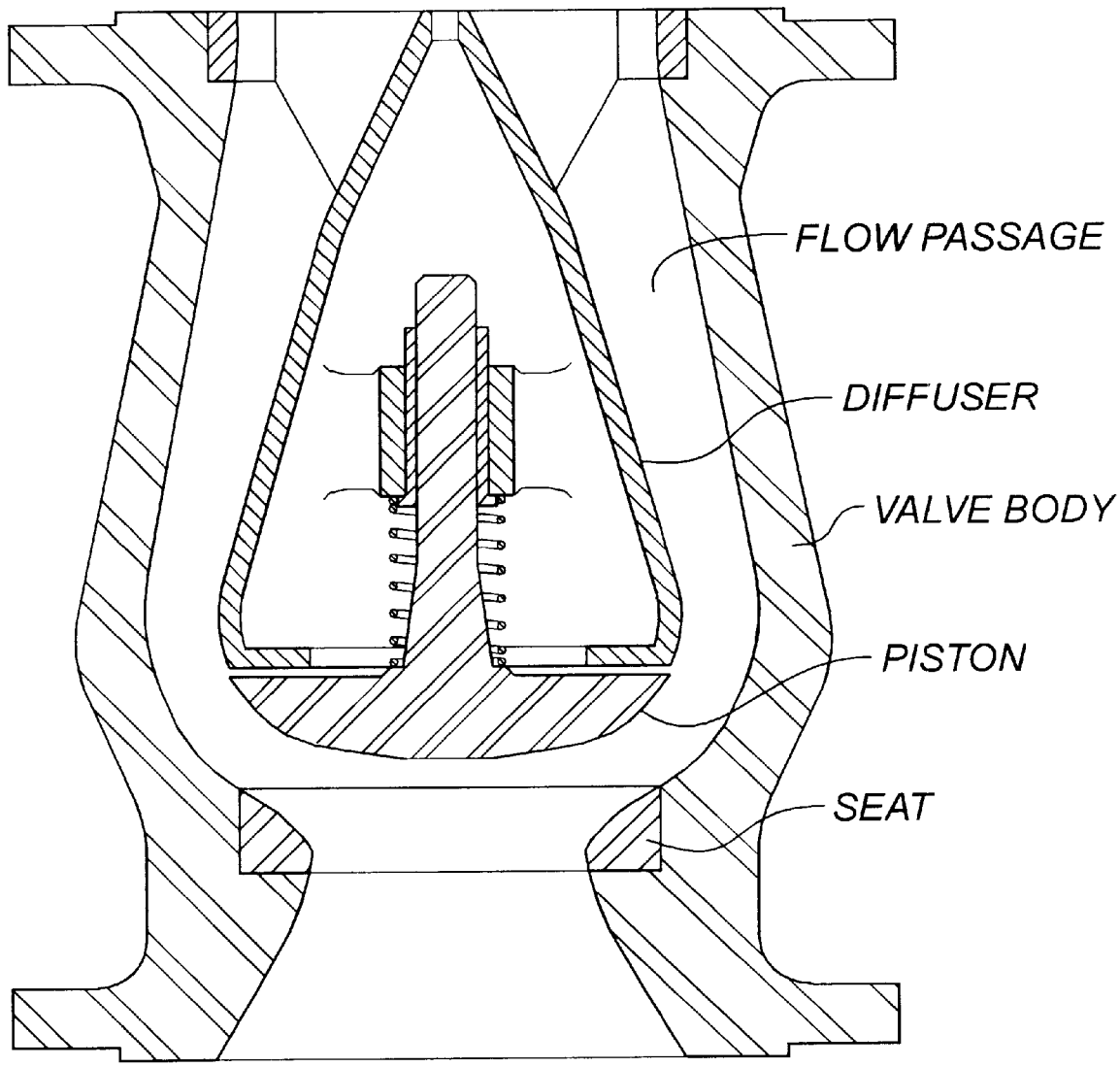
FIG. 1 is a sectional side view of a prior art, piston-type check valve with diffuser.
Figure 2:
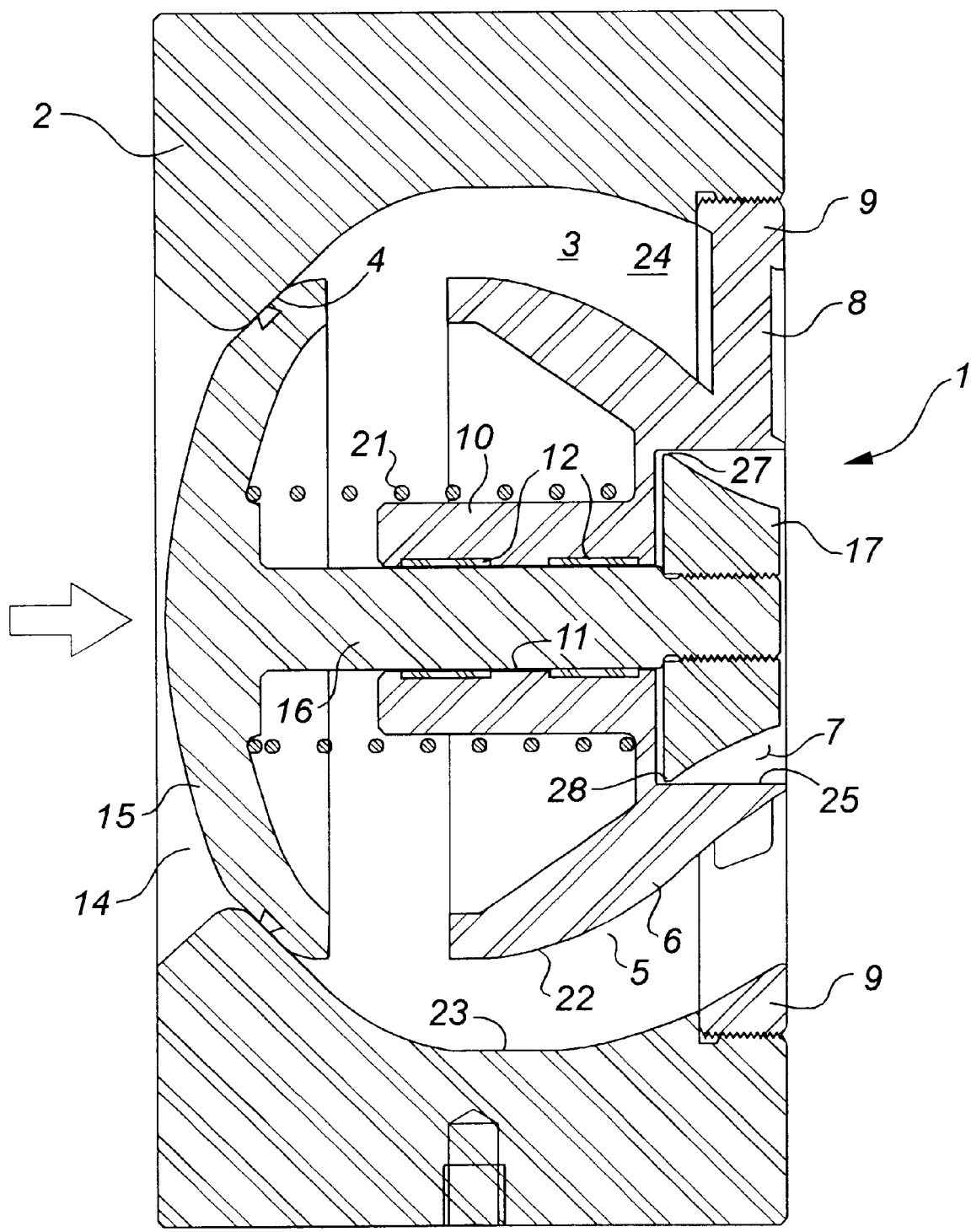
FIG. 2 is a sectional side view of a check valve in accordance with the invention, showing the piston in the closed position with the arrow indicating flow direction.
Figure 3:
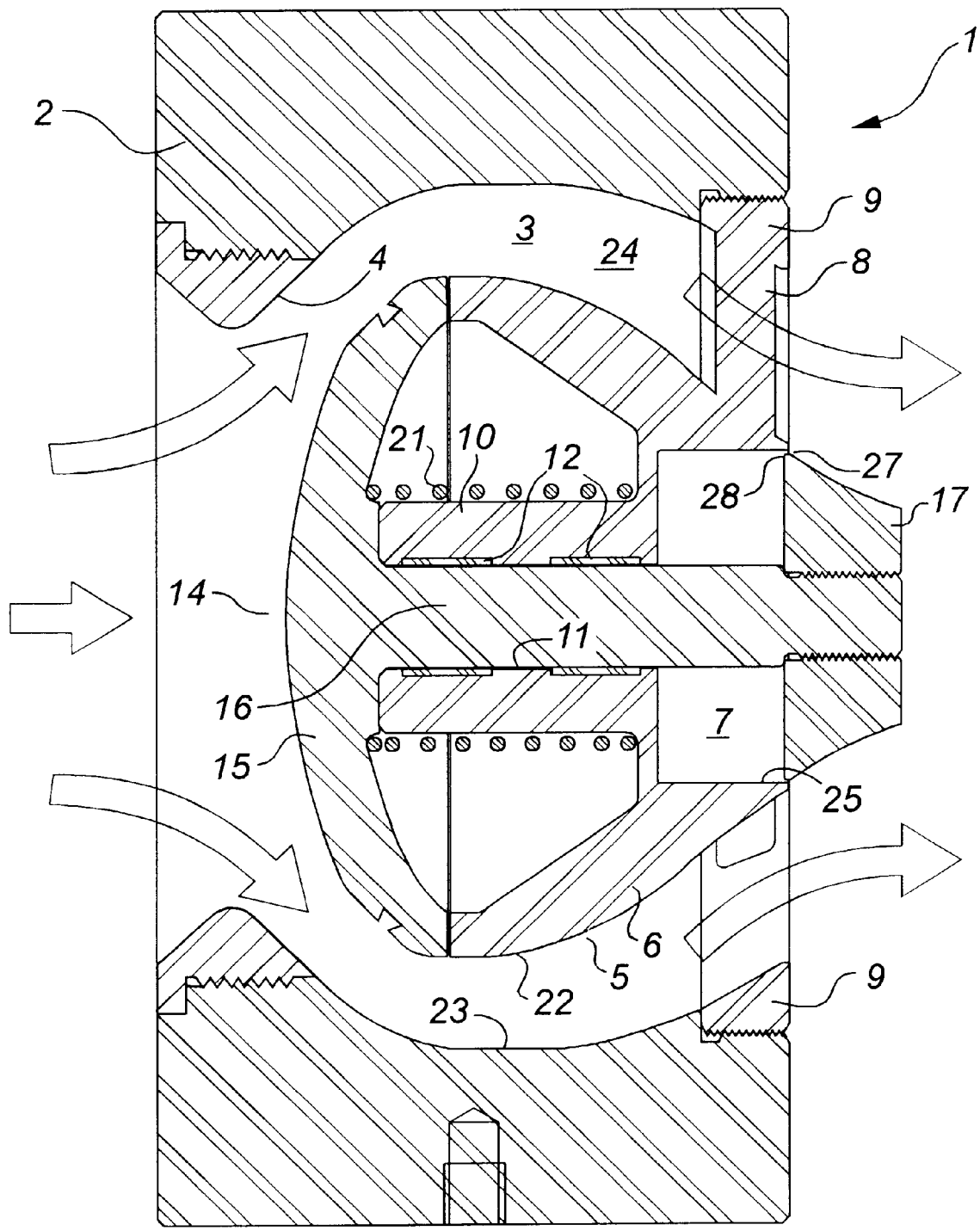
FIG. 3 is a sectional side view of the valve of FIG. 2 showing the piston in the open position, the valve having a threaded insert seat.
Figure 4:
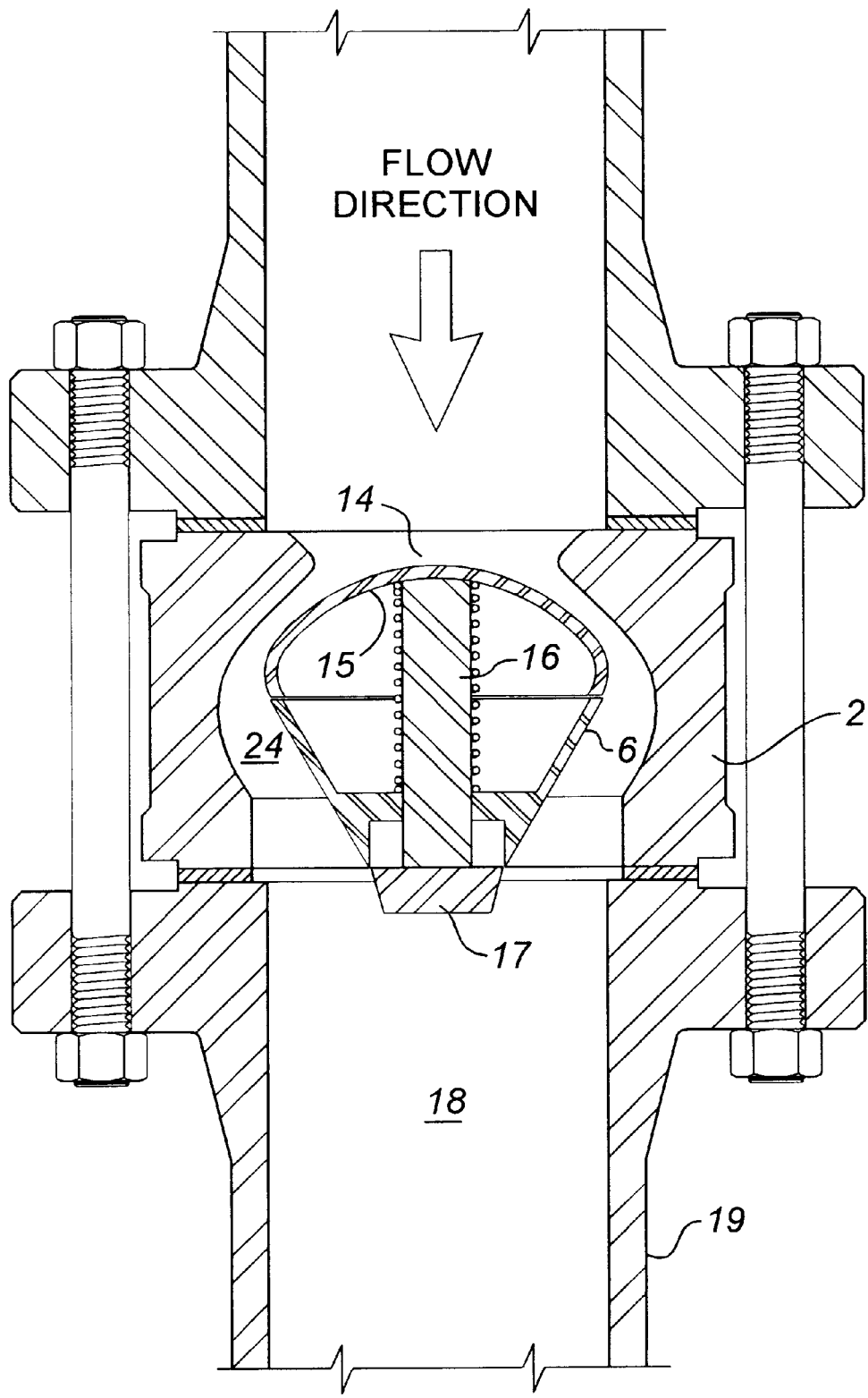
FIG. 4 is a top sectional view of the valve of FIG. 2, showing the valve in an open condition and having a wafer-type body, the valve being mounted in a flow line.

The check valve 1 comprises a valve body 2 forming an internal, longitudinal, through passage 3. An internal, annular valve seat 4 is provided at the upstream end of the valve 1. The body may be of wafer-type (see FIG. 2) or flanged or studded.

A diffuser 5 is centrally mounted in the passage 3 by ribs 8 and ring 9. The diffuser 5 comprises a hollow body 6 of truncated, tear drop-shaped configuration. The outer surface 22 of the diffuser body 6 combines with the inner surface 23 of the valve body 2 to form an elongated, streamlined flow passageway 24.

The diffuser body 6 supports an internal, central guide member 10 forming a longitudinal bore 11 coincident with the axis of the valve body 2. The body 6 and guide member 10 combine to form a diffuser body/guide member unit.

The guide member bore 11 has an expanded diameter section at its downstream end, thereby forming the recess 7.

The guide member 10 is fitted with bearings 12 in its inner surface.

A piston 14 is provided, comprising a disc 15 and shaft 16. The disc 15 is positioned at the upstream end of the valve body 2 and is operative to seal against the seat 4 in the closed position.

The shaft 16 has a sliding fit in the guide member bore 11.

At its downstream end, the shaft 16 carries an annular tail member 17. When the piston 14 is in the closed position, the tail member 17 is retracted into the recess 7. When the piston 14 is in the open position, the tail member 17 forms an extension of the diffuser body 6 and protrudes into the bore 18 of the line 19. The tail member 17 is preferably shaped to conform with the shape of the diffuser body 6, So as provide a smooth continuance of the diffuser surface 22. However, it is not essential that the tail member be formed to provide a smooth continuance of the tapering downstream end of the diffuser body.

A return spring 21 is positioned around the shaft 16 and acts between the diffuser body/guide member unit and the disc 15 to normally urge the piston 14 to the closed position.

Figure 5:
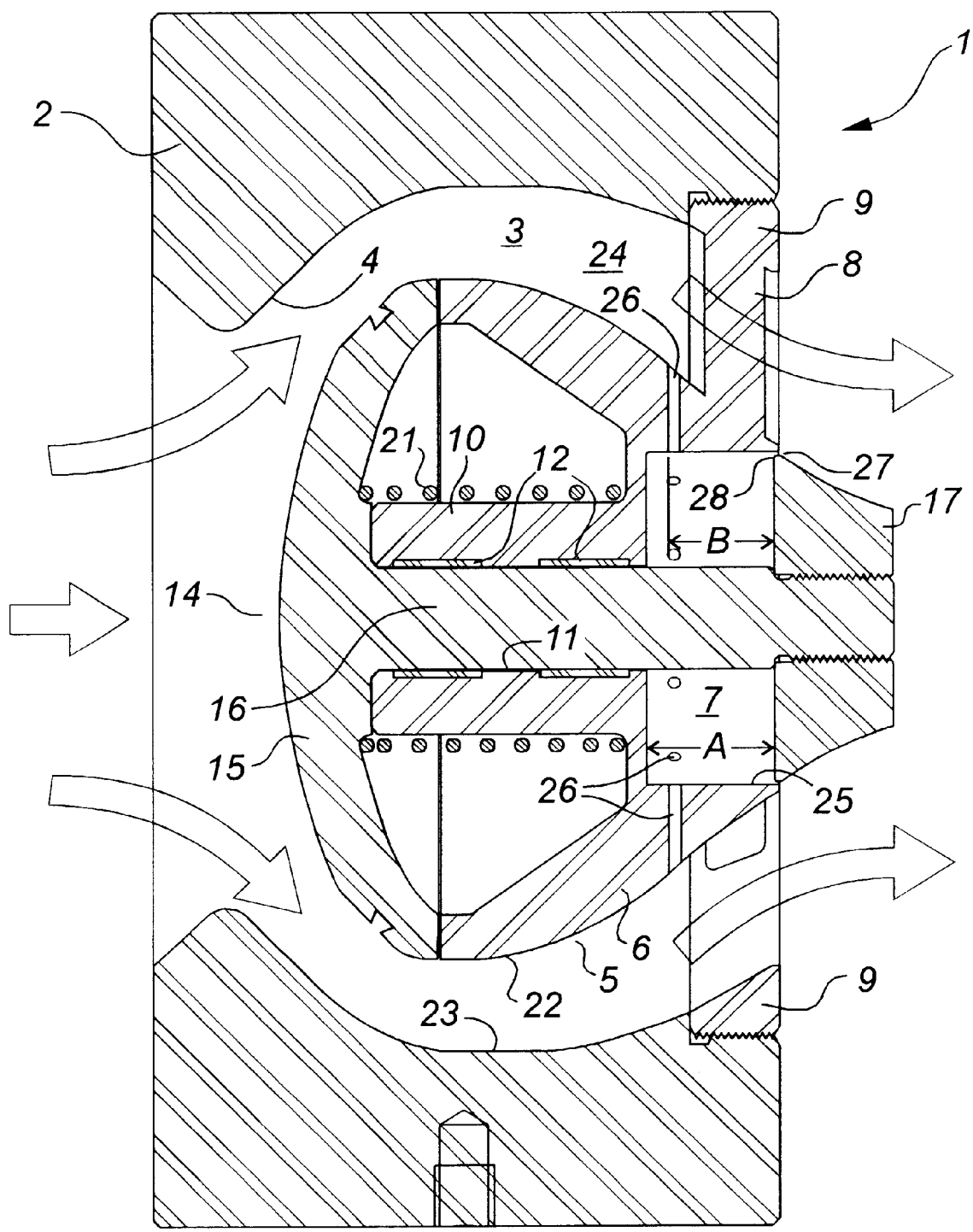
FIG. 5 is a side view similar to FIG. 3, showing a clearance and dump passage.
Figure 6:
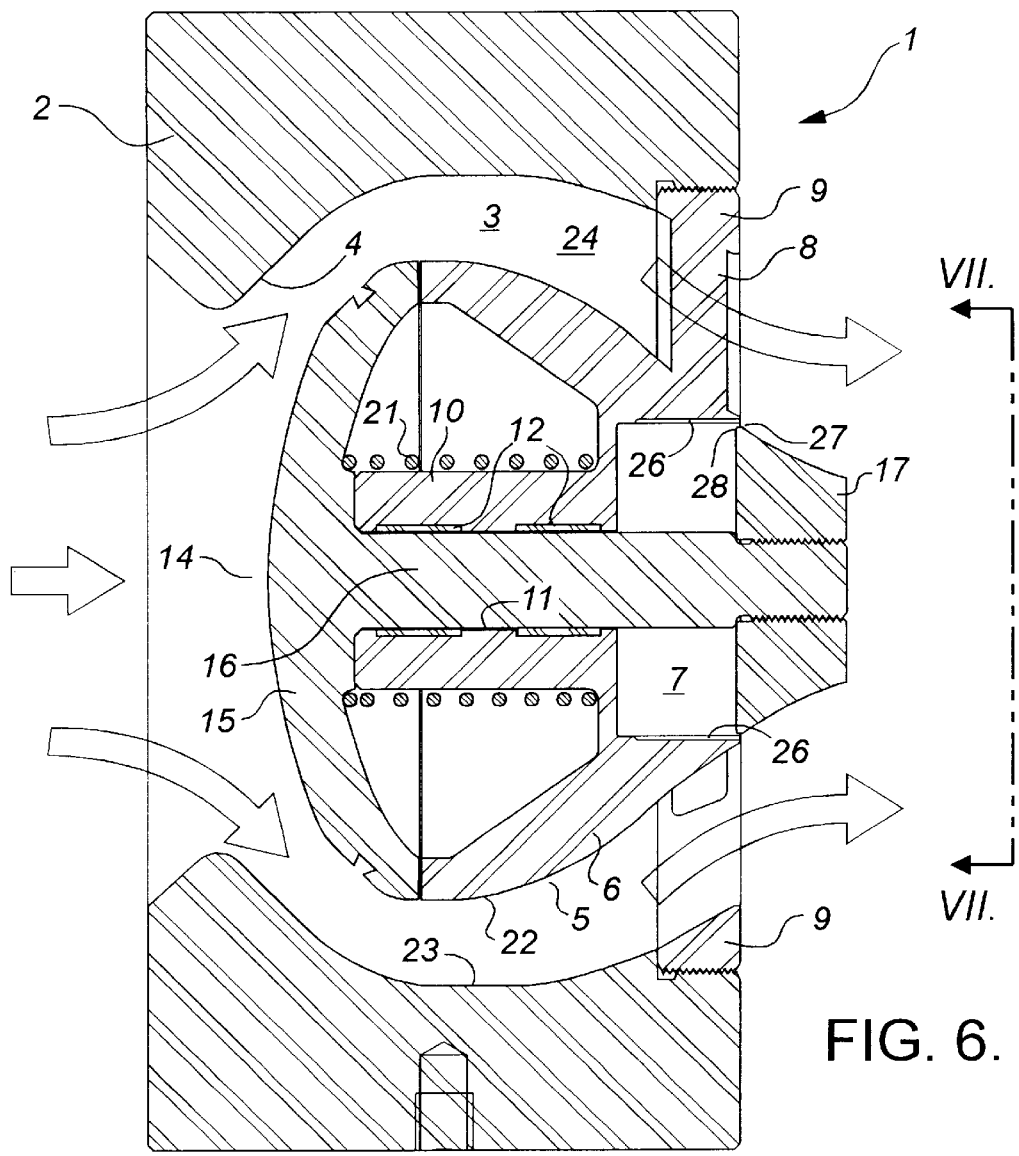
FIG. 6 is a side view similar to FIG. 2, showing an alternative dump passage.
Figure 7:
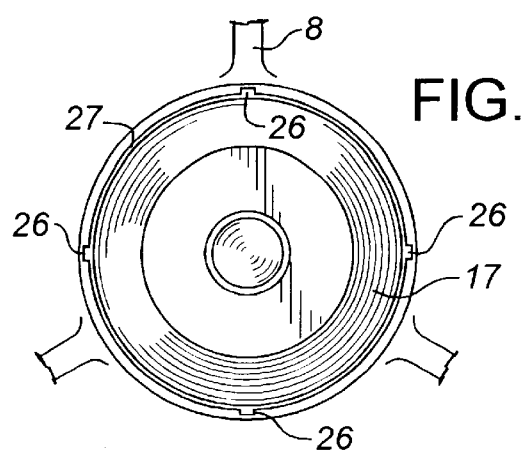
FIG. 7 is an elevation of the valve shown in FIG. 6, from the downstream end.
Figure 8:
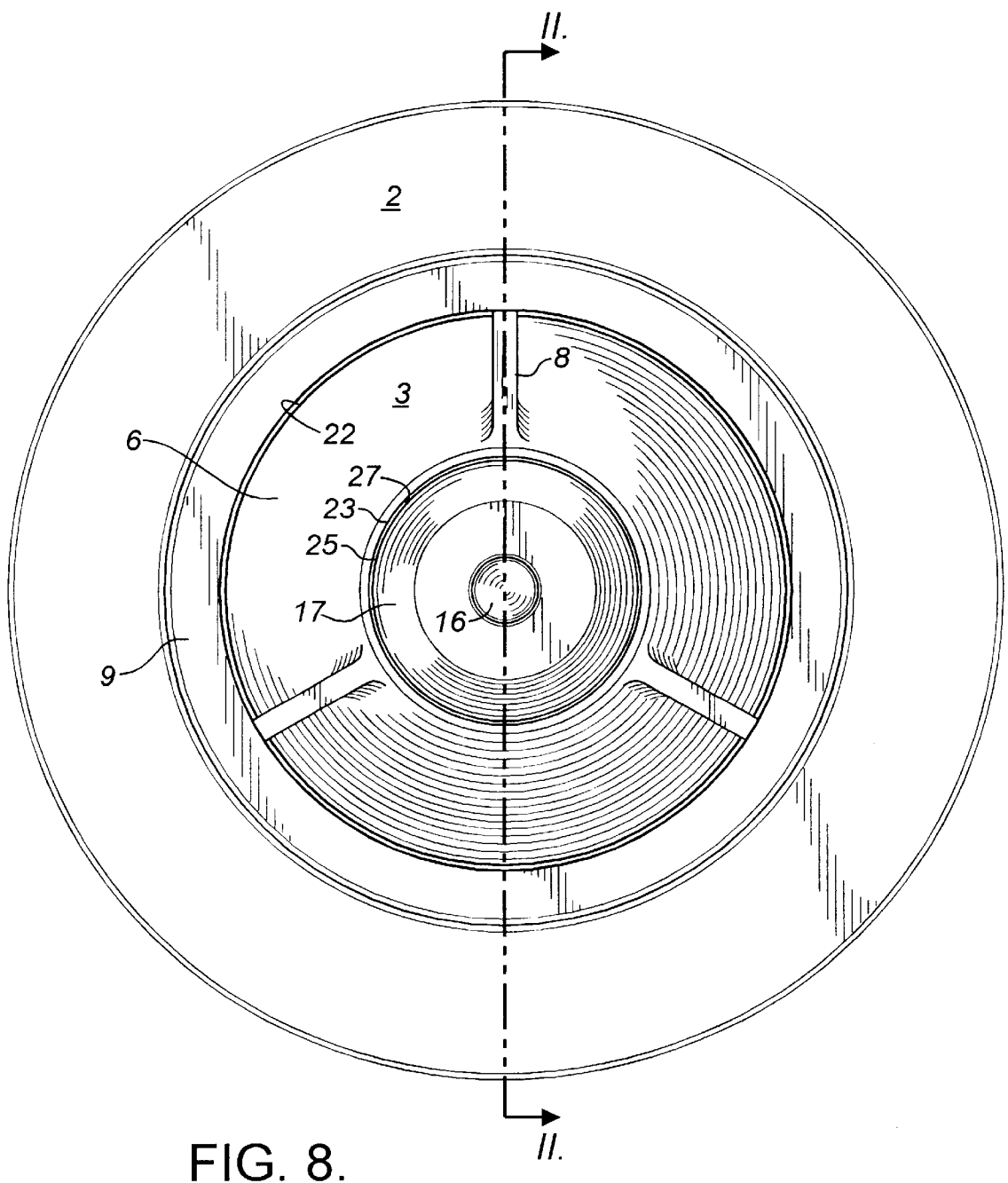
FIG. 8 is an end view of the valve of FIG. 2.

A clearance 27 is formed between the outer circumferential surface 23 of the tail member 17 and the inner surface 25 of the recess 7. This clearance 27 allows for metered escape of fluid from the recess 7 on the closing stroke. In addition, as shown in FIGS. 5 and 6, a dump passage 26 can be provided in the diffuser body/guide member unit to connect the recess 7 with the passageway 24. Thus, during the initial portion of the closing stroke, fluid can readily move from the recess 7 through both the clearance 27 and dump passage 26. However, once the tail member 17 blocks the dump passage 26, the fluid can only escape through the clearance 27 at a metered rate, thereby damping the final portion of the closing stroke.

From the foregoing, it will be noted that a shorter valve body can now be used while still deriving the benefit of an elongated diffuser. In addition, the final portion of the closing stroke of the piston 14 can be damped.

The embodiments of the invention in which an exclusive property of privilege is claimed are defined as follows:

1. A piston-type check valve having an internal diffuser, said valve having upstream and downstream ends, comprising:

a valve body having an inner surface forming a through passage, said body further having an internal annular seat at its upstream end;

a diffuser mounted within the passage downstream of the seat, said diffuser comprising a hollow diffuser body having an outer surface that cooperates with the valve body's inner surface to form an annular streamlined passageway for fluid flow through the valve, said diffuser having a downstream end which is substantially even with the downstream end of the body;

said diffuser body supporting an internal, centrally located guide member, said diffuser body and guide member combining to provide a unit having an inner surface forming an axial bore having an enlarged diameter section at its downstream end, so that a recess is formed;

a sliding piston associated with the diffuser and comprising a disc and shaft, the piston being movable between a closed position, in which the disc seals against the seat and closes the upstream end of the annular passage, and an open position whereby fluid may flow through the annular passage, the shaft extending through the bore of the unit and being guided thereby;

a tail member mounted on the downstream end of the shaft and being receivable in the recess in the closed position, said tail member, when the piston is in the open position, providing an extension of the diffuser beyond the downstream end of the body and, when in the closed position, being retracted fully within the body;

a clearance is formed between the tail member and the bore surface of the unit, for the metered escape of fluid from the recess on the closing stroke;

the unit forms a dump passage connecting the recess, part way along its length, with the passageway, so that the closing stroke of the piston is damped when the tail member blocks the dump passage; and means for normally urging the piston to the closed position.

\* \* \* \* \*